United States Patent [19]
Webb et al.

[11] Patent Number: 5,673,391
[45] Date of Patent: Sep. 30, 1997

[54] HARDWARE RETRY TRAP FOR MILLICODED PROCESSOR

[75] Inventors: Charles Franklin Webb, Poughkeepsie; Mark Steven Farrell, Pleasant Valley; Scott Barnett Swaney, Catskill, all of N.Y.

[73] Assignee: International Business Machines Corporation, Armonk, N.Y.

[21] Appl. No.: 414,977

[22] Filed: Mar. 31, 1995

[51] Int. Cl.⁶ .................................................. G06F 11/34
[52] U.S. Cl. ...................... 395/182.18; 395/182.21; 395/376; 395/800
[58] Field of Search .................. 395/182.13, 182.14, 395/182.15, 182.19, 182.21, 184.01, 185.02, 376, 800; 364/260.8, 262.4, 262.6, 262.8, 266.5

[56] References Cited

U.S. PATENT DOCUMENTS

| | | |
|---|---|---|
| 4,641,305 | 2/1987 | Joyce et al. . |
| 4,755,995 | 7/1988 | Anderson et al. . |
| 4,851,995 | 7/1989 | Hsu et al. . |
| 4,901,233 | 2/1990 | Liptay . |
| 4,999,837 | 3/1991 | Reynolds et al. . |
| 5,129,080 | 7/1992 | Smith . |
| 5,226,164 | 7/1993 | Nadas et al. . |
| 5,280,593 | 1/1994 | Bullions, III et al. . |
| 5,293,613 | 3/1994 | Hayden et al. . |
| 5,307,504 | 4/1994 | Robinson et al. ............... 364/200 |
| 5,325,520 | 6/1994 | Nguyen et al. . |

FOREIGN PATENT DOCUMENTS

| | | | |
|---|---|---|---|
| 56-9846 | 1/1981 | Japan | .......... G06F 11/14 |
| 57-48145 | 3/1982 | Japan | .......... G06F 11/14 |
| 9178547 | 10/1984 | Japan | .......... G06F 11/14 |
| 62-77650 | 4/1987 | Japan | .......... G06F 11/14 |
| 4181331 | 6/1992 | Japan | .......... G06F 11/14 |
| 4195433 | 7/1992 | Japan | .......... G06F 11/14 |

OTHER PUBLICATIONS

IBM/TDB vol. 35 No. 4A Sep. 1992 –Milli–Code: Bullions, Chang, Meltzer, Nadas, Pedersen.

*Primary Examiner*—Robert W. Beausoliel, Jr.
*Assistant Examiner*—Albert De'cady
*Attorney, Agent, or Firm*—Lynn L. Augspurger; Laurence J. Marhoefer

[57] ABSTRACT

Retry trap in the processor system detects the occurrence of a hardware retry during a millicode routine. In operation, millicode resets the retry trap to "0" at the start of a millicode sequence that is sensitive to a retry operation being at some stage of the millicode sequence. The millicode routine tests the retry latch state at one or more points in the sequence to determine if a retry has occurred since the start of the sequence, which is sensitive to a retry operation. The action taken in response to a determination that a retry operation has occurred depends upon the type of potential damage to the system state as a result of the occurrence of the retry operation during the millicode sequence.

12 Claims, 3 Drawing Sheets

HARDWARE RETRY TRAP FOR MILLICODED PROCESSOR

BACKGROUND OF THE INVENTION

Field of the Invention

This invention relates to improvements in pipelined computer processors that execute relatively simple instructions in hardware controlled execution units and execute relatively complex instructions in a milli-mode architected state with vertical microcode (i.e. millicode) routines executing in the same hardware controlled execution units. More particularly, this invention relates to an improved millicode system that allows retry operations to be performed during a millicode instruction sequence.

Cross Reference to Related Applications

The present U.S. patent application is related to the following copending U.S. patent applications which are assigned to the assignee of the present application, and which are incorporated herein by reference.

Application Ser. No. 08/414,154, filed Mar. 31, 1995 (attorney Docket No. PO9-94-045), entitled "Specialized Millicode Instruction."

Application Ser. No. 08/419,821, filed Mar. 31, 1995 (attorney Docket No. PO9-94-054), entitled "Millicode Read-Only Storage With Entry Point Patch Control."

Application Ser. No. 08/414,158, filed Mar. 31, 1995 (attorney Docket No. PO9-94-060), entitled "Addressing Extended Memory Using Millicode."

Application Ser. No. 08/414,812, filed Mar. 31, 1995 (attorney Docket No. PO9-94-061), entitled "Mapping Processor State Into A Millicode Addressable Processor State Register Array."

Application Ser. No. 08/414,164, filed Mar. 31, 1995 (attorney Docket No. PO9-94-062), entitled "Linking Program Access Register Number With Millicode Operand Access."

Application Ser. No. 08/414,975, filed Mar. 31, 1995 (attorney Docket No. PO9-94-069), entitled "Priority And Recovery Method For Serialization Of System Quiesce State."

Application Ser. No. 08/414,961, filed Mar. 31, 1995, (attorney Docket No. PO9-95-009), entitled "Specialized Millicode Instruction for String Operations."

Description of the Prior Art

Instruction sets used in computer systems employing so-called Complex Instruction Set Computing (CISC) architecture include both simple instructions (e.g. Load, or Add) and complex instructions (e.g. Program Call, or Load Address Space Parameters). As an example to which the invention has particular relevance, see "IBM Enterprise Systems Architecture/390 Principles of Operation" (Publication Number SA22-7201-02, available from IBM Corporation, Armonk, N.Y.), which is incorporated herein by reference in its entirety. As these computer systems (e.g. IBM System 390) have become more powerful, larger percentages of the instruction set have been implemented using hardware execution units to increase the systems performance. Conventionally, the complex functions are implemented in microcode because building hardware execution units to execute them is expensive and error prone.

Implementing complex functions in microcode provides flexibility to fix problems and expandability in that additional functions can be included later. In certain prior art machines, where much of the processor is hardware controlled, a dedicated microprocessor based execution unit is often provided in order to implement the complex functions. This unit can be microprogrammed to execute complex instructions and complex functions such as handling interrupt conditions.

More recently, prior art proposals have been advanced for machines with a so-called milli-mode operating capability; see, for example, IBM Technical Disclosure Bulletin Vol. 35, No. 4A of September 1992, incorporated herein by reference, and U.S. Pat. Nos. 5,280,593 and 5,226,164 assigned to the assignee of this invention and also incorporated herein by reference.

A milli-mode operation enables implementation of complex functions in a large, hardware controlled, pipelined, general purpose digital computer without a microprocessor. Milli-mode implements these complex functions with the flexibility provided by firmware and avoids a packaging problem introduced by the inclusion of microprocessor hardware. Rather than a microprocessor, milli-mode uses the preexisting dataflow and hardware controlled execution units of a pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions.

Milli-mode detection logic in the instruction decode logic detects the requirement to enter milli-mode, and this causes millicode routines to be fetched. The millicode routines are decoded by the decoder hardware and dispatched for execution in the same way as the architected macro-instructions (system-mode instructions).

Practically all of the architected macro-instructions that are implemented as hardware controlled instructions can be executed in milli-mode. The set of instructions available in milli-mode can be considered to be an alternate architecture that the processor can execute.

The overall recovery mechanism is disclosed in copending application, attorney docket No. PO9-93-035, Ser. No. 08/149,260, filed Nov. 9, 1993, entitled "Data Processor With Enhanced Error Recovery," which is incorporated herein by reference. As disclosed in that application, the entire processor state is buffer stored, and has a hardware checkpoint after every hardware instruction. Each hardware instruction, either a program instruction or a millicode instruction, or millicode setup, etc., can be retried simply by restoring the processor state from the checkpoint state and resuming operation. Retry is performed at a millicode instruction level without need to resort to a specialized millicode retry algorithm. In general, either hardware retry is successful and execution may proceed, or retry is unsuccessful due to a "hard" error in the processor and a central processor check stop is required.

There are some cases, however, where hardware retry is successful but execution cannot continue normally without risk of incorrect results. Some of these cases are detected by hardware, and will cause an exigent machine check interrupt to be pending after the processor state has been restored from the processor state unit. This interrupt will be taken immediately, regardless of the processor state, and will be handled by millicode.

In addition, there are a number of millicoded operations which may not work correctly if they span a hardware retry action. This is because the hardware retry affects processor operations in several ways. The time required for a millicode sequence is significantly affected by retry. Some asynchronous events may be lost during retry operation. The "locked" status on a line involved in an interlocked update must be dropped when a retry occurs. The quiesce request bits (from this and other processors) are reset to zeros, and new quiesce requests may be lost.

Any millicoded sequence that may be affected by these things must account for the possibility of retry by detecting retry events and responding appropriately.

An object of this invention is the provision of a retry trap to allow millicode operation in special circumstances without limiting the hardware retry mechanism.

Briefly, this invention contemplates the provision of a retry trap in the processor system to detect the occurrence of a hardware retry during a millicode routine. The retry trap includes a control latch, which is preferably one bit in a system control register. The latch is set (e.g. to "1") each time a retry operation is undertaken. Because the retry trap is part of a system control register, millicode can both read and write this latch via the millicode instructions which access this control register. In operation, millicode resets the retry trap to "0" at the start of a millicode sequence that is sensitive to a retry operation being at some stage of the millicode sequence. The millicode routine tests the retry latch state at one or more points in the sequence to determine if a retry has occurred since the start of the sequence, which is sensitive to a retry operation. The action taken in response to a determination that a retry operation has occurred depends upon the type of potential damage to the system state as a result of the occurrence of the retry operation during the millicode sequence. Examples of millicode actions include: re-execution of the millicode sequence; restoration of the system state and re-execution of the millicode sequence; presentation of a machine check to the software; central processor checkstop; and system checkstop.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

This following exemplary embodiment of the invention is applicable in the overall context of a system generally conforming to IBM 390 system architecture. A more detailed description of the conventional elements of such a 390 system processor can be found, for example, in U.S. Pat. No. 4,901,233 to John S. Liptay, assigned to the same assignee as the present invention, and incorporated by reference, in its entirety, as if printed in full below. While the System 390 environment will be used as an example, it should be understood that the present invention is also readily applicable to other IBM (e.g. IBM System 370) and non-IBM architectures as well.

While not limited thereto, the invention is particularly well suited for use in conjunction with the enhanced error recovery system described in copending application, attorney docket PO9-93-035, Ser. No. 08/149,260 filed, Nov. 9, 1993, assigned to the assignee of this application, and also incorporated herein by reference.

Figure 1:
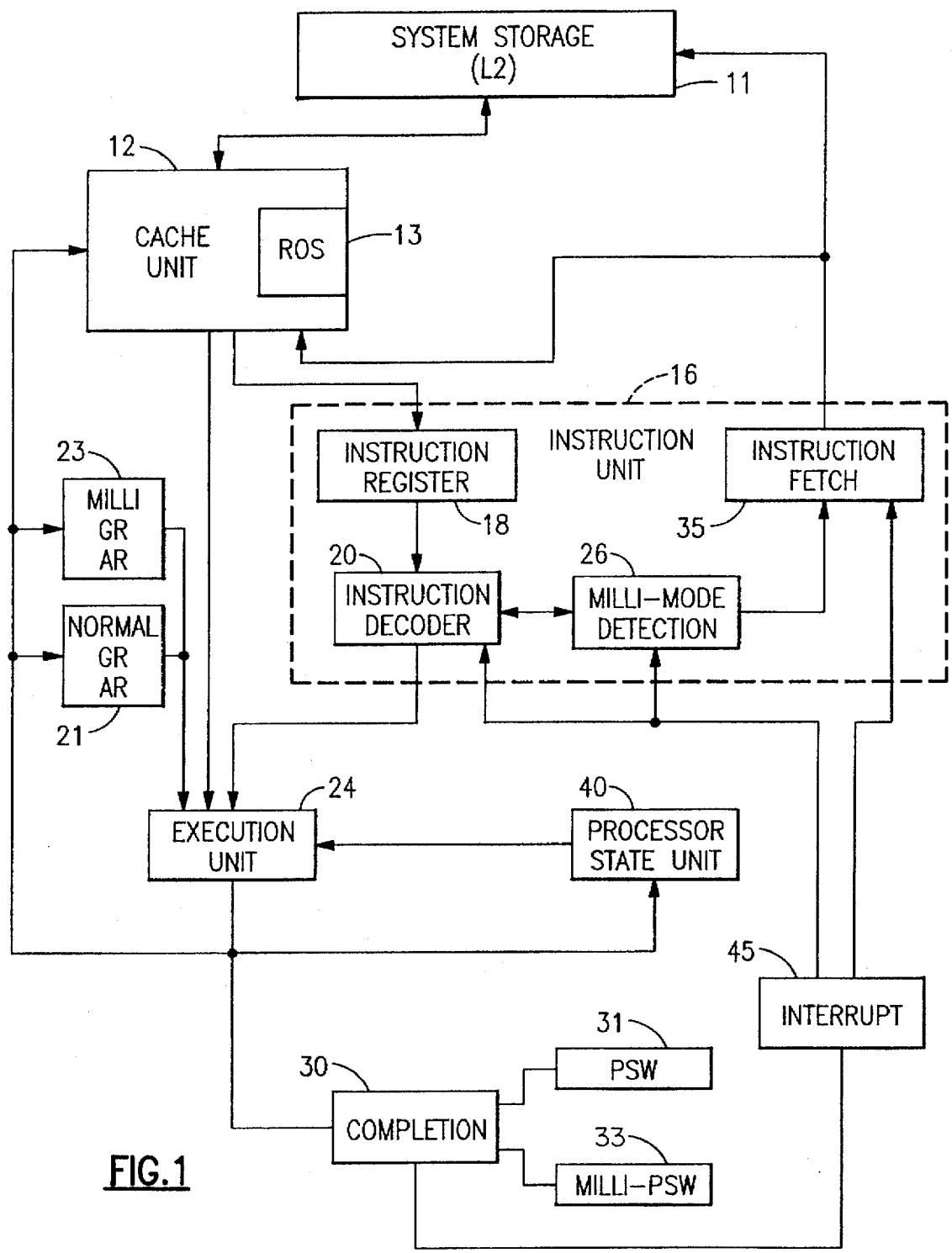
FIG. 1 is a block diagram illustrating the components of a millicode system in accordance with a preferred specific embodiment of the invention.

Referring now to FIG. 1, elements of a system relevant to this invention include a system storage N, and a cache memory unit 12. The system storage N contains the instructions that the processor is executing as well as the data those instructions are manipulating. The cache memory unit 12, which includes a copy of the data and instructions the processor is presently executing, in this preferred embodiment is a split cache providing interleaved double word addressing. The cache memory 12 logically includes a contiguously addressable read only store 13, in which code for executing certain frequently invoked milli-mode routines is stored.

An instruction unit subsystem 16 includes an instruction buffer (not shown in FIG. 1), instruction registers 18 and an instruction decoder 20. The instruction unit subsystem receives macro-instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 21 for normal macro-code instruction execution and to a set of general purpose registers and access registers 23 for millicode instruction execution. Control logic controls the exchange of data between the two sets of registers when beginning or terminating a millicode routine. Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 25 and places the decoder 20 into a milli-mode operating state. In this state the decoder is enabled to decode milli-mode instructions. Milli-mode instructions are vertical microcode, consisting of a mixture of regular microcode instructions and special milli-mode only instructions, all of which can be executed in the execution unit 24. The special instructions provide control functions needed by the millicode routines. The set of millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and the completion logic 30 are connected to read from/write to the PSW and the milli-PSW registers. Thus, at any given point the execution units or the completion logic can read or update the appropriate one of the PSW and/or milli-PSW registers. A processor state unit 40 maintains the entire updated status of the architected system both in regular mode and milli-mode operation. In the event of a detected error, the processor state unit 40 provides a resource to recreate the status of the system from a check point state in order to allow a retry of the error causing operation.

Milli-mode is enabled when the milli-mode detection logic 26 recognizes that the macro-instruction being decoded is to be implemented with millicode. In response to this recognition, the detection logic 26 signals the decoder 20, the instruction fetch controls 35 and register controls in the execution unit 24. In response to the milli-mode recognition signal from the detection logic 26, the decoder 20 suspends macro-mode decoding, the execution unit register control copies the contents of the GPRs 21 to the milli-registers 23 and causes the system to subsequently use the milli-registers 23. The milli-mode detection logic 26 generates a millicode entry point address.

The entry point address (generated by the milli-mode detection logic 26) is used by the control logic 35 to address the cache 12. Milli-instructions from the cache are sent to the instruction registers 18 where the decoder 20 decodes them and schedules them for execution.

When the processor enters milli-mode, it executes and completes the macro-instructions already in the pipeline conceptually prior to the instruction that caused entry into milli-mode. As the processor completes the macro-instructions, it updates the appropriate GPRs. At the same time, the processor decodes and executes the milli-instructions that implement the macro-instruction that caused entry into milli-mode.

At some point the macro-instruction immediately prior to the instruction that caused entry to milli-mode will be indicated completed in the completion logic 30. Only then does the processor begin to complete the milli-instructions. The processor then continues decoding, executing and completing the milli-instructions.

Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation.

Completion of a MEND milli-instruction causes the processor completion logic to begin completing macro-instructions.

The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements.

The processor proceeds to decode, execute and complete the milli-instruction in the milli-routine for interrupts. Eventually, the decoder recognizes a MEND milli-instruction. This causes the decoder to stop decoding in milli-mode. Depending on whether or not there are additional interrupts that require servicing, the decoder hardware will either redo the interrupt process or return to decoding macro-instructions from the cache.

Figure 2:
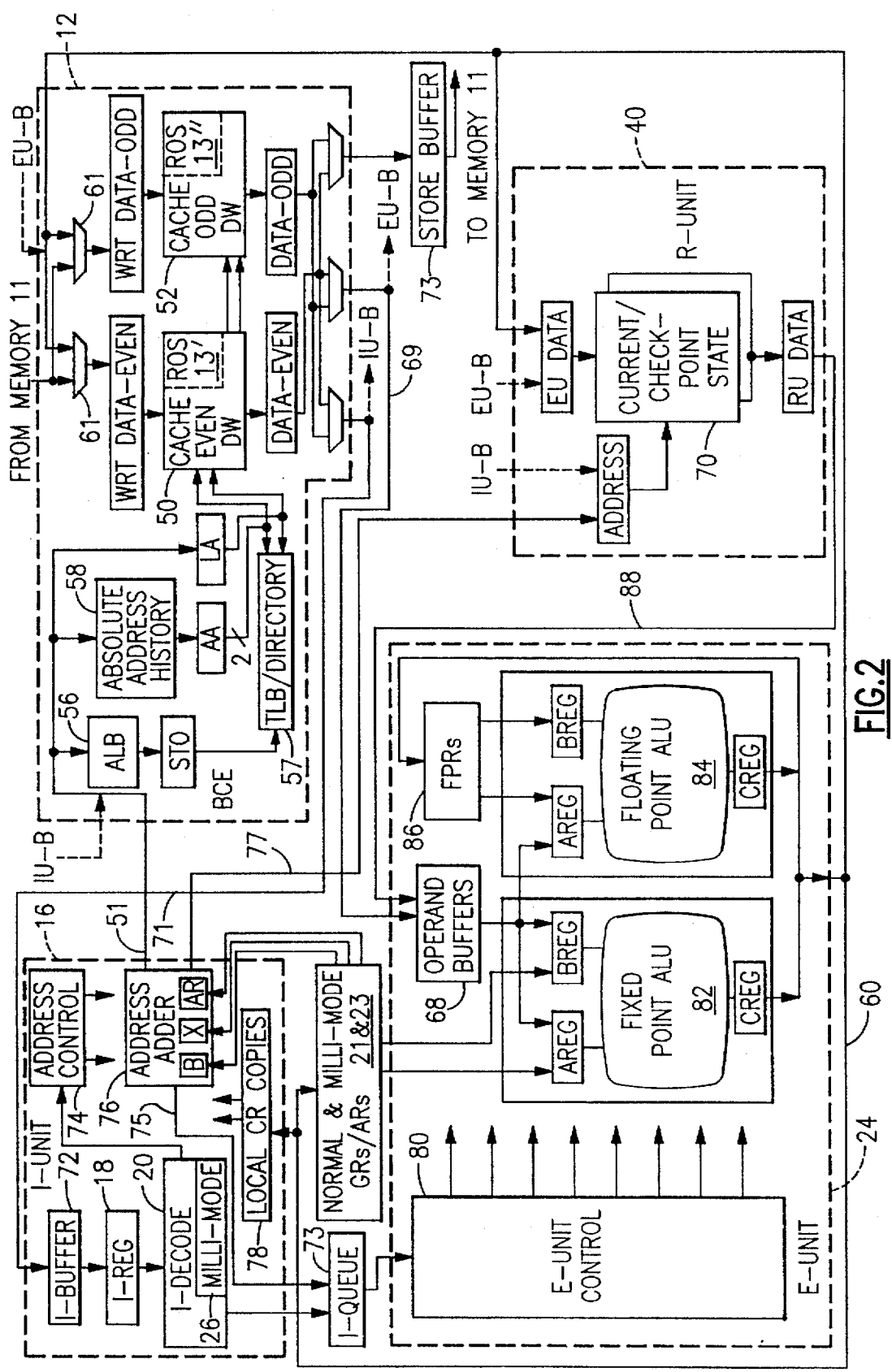
FIG. 2 is a block diagram showing elements of the system of FIG. 1 in more detail.

Referring now to FIG. 2, it shows in more detail components of the system shown in FIG. 1. The cache unit 12 in this preferred embodiment is an interleaved, double word cache comprised of an even data word cache 50 and an odd data word cache 52, each independently addressable. Cache 50 and cache 52, each include a physically independent, but logically contiguous, read only store (ROS) units 13' and 13" respectively. The read only store units 13' and 13" store frequently invoked milli-mode routines but typically not all of the millicode routines. Storing frequently used routines in the read only store section of the cache increases perforrmance speed while practical considerations, such as chip area requirements in VLSI implementations, limit the size of the read only store. The read only store units are logical extensions of their respective cache units 50 and 52.

Virtual/logical addresses on bus 51 from the instruction unit 16 are mapped to real/absolute addresses by an absolute address buffer (ALB) 56, and a translation look aside buffer (TLB) 57. An absolute address history from unit 58 maintains current the translation look aside buffer 57.

A systemwide store data and process status update bus 60 connects the output of the execution unit 24 to input gates of cache unit 12 in order to write data into the cache. Bus 60 also couples this same data to the processor state unit 40, to the normal and milli-mode general purpose and address registers 21 and 23, and to the instruction unit 16. A bus 69 couples operands read from the cache 12 to operand buffers 68 in the execution unit 24 and to processor state register array 70 in the processor state unit 40. A bus 71 couples instructions read from the cache 12 to an instruction buffer 72 in the instruction unit 16 and to the processor state register array 70. Instructions and data are transferred to the main memory 11 via a buffer store 73.

The instruction unit 16 includes, in addition to the instruction register 18, the instruction decoder 20, and the milli-mode detector 26, address control logic 74 and an address adder 76. A bus 75 couples the address adder 76 to an instruction queue buffer 73. A local CR copy unit 78 directs local copies of the execution unit output data through the system. Bus 51 couples the full address from the address adder 76 to the input of cache unit 12 and a bus 77 couples, for example, the low order bits (i.e. eight) of the address adder output as an address input to the processor state unit 40.

The execution unit includes a hardware controller 80 and two ALUs; a fixed point ALU 82 and a floating point ALU 84 with operand buffers 68, a floating point register 86, respective A and B input registers, and C output registers. The normal and milli-mode general registers and access registers 21 and 23 are coupled to the A and B input registers of the fixed point ALU 82 and the floating point ALU A register.

A bus 88 couples the processor state unit data output register array 70 to the operand buffers 68 so that the check point status of the system can be replicated for a retry in the event of an error. The store data and process status update bus 60 couples the C output registers of both the fixed and floating point ALU 82 and 84 to the normal and milli-mode general and access registers 21 and 23 and to the local CR copy unit 78.

Figure 3:
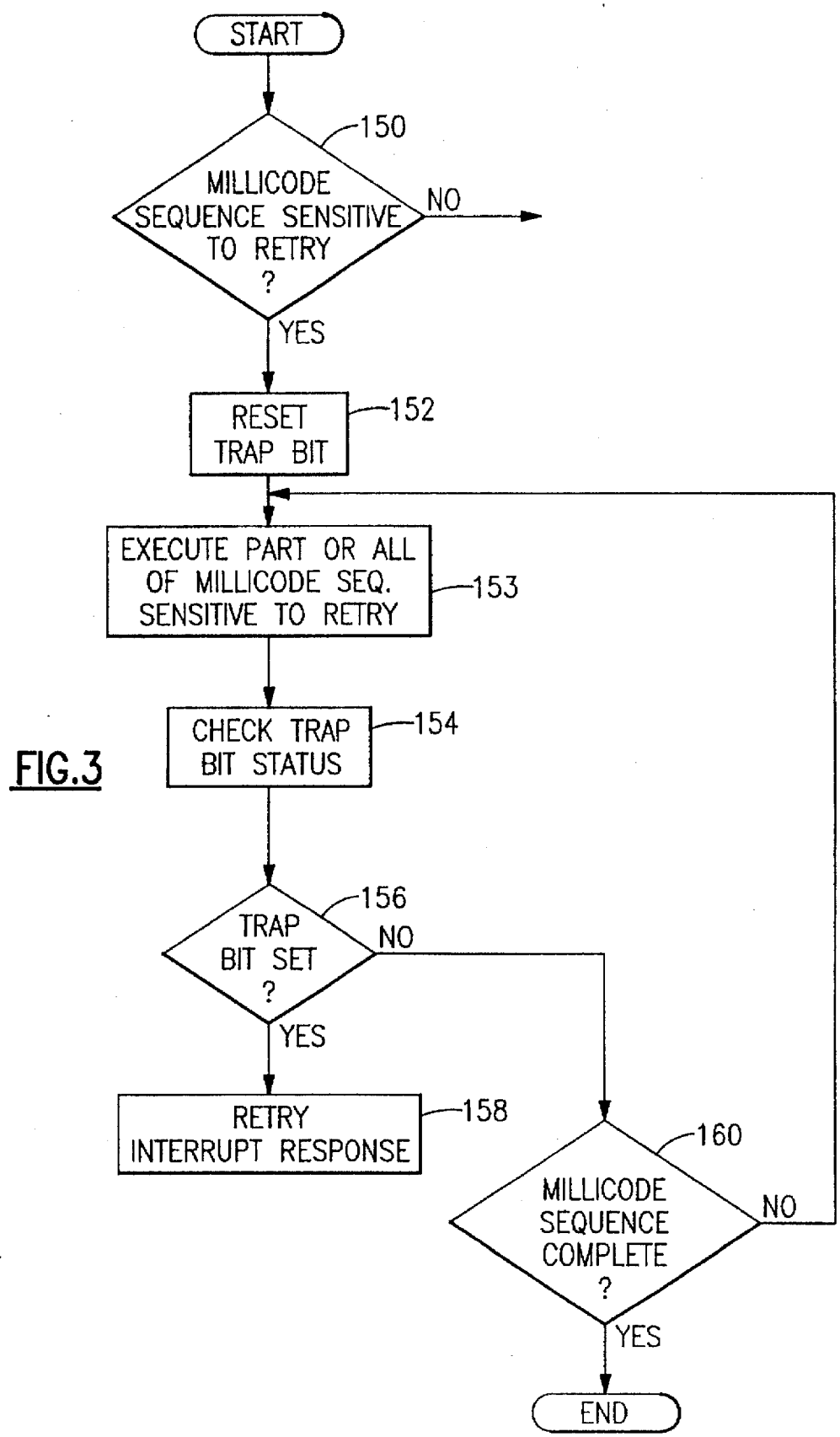
FIG. 3 is a flow diagram of a millicode retry trap operation in accordance with the teachings of the invention.

Referring now to FIG. 3, to detect hardware retries and allow millicode to handle situations in which a retry occurs during a millicode routine, a "retry trap" mechanism is included in the system shown in FIG. 2. In a preferred embodiment, the retry trap consists of a control latch configured as one bit in a system control register mapped into the processor state array 70 in the processor state unit 40. This latch is set to "1" by the hardware controlling retry and the latch is set when a hardware refresh operation is performed, which is part of all retry operations. Because it is part of a system control register, millicode can both read and write this latch via the millicode instructions which access those control registers. In addition, millicode may test this bit directly as branch condition, which provides better performance than reading and testing the register.

If a millicode sequence is sensitive to a retry during the sequence, block 150, millicode resets this latch to "0" at the start of any sequence, block 152. During execution of the millicode sequence sensitive to retry (block 153), millicode tests the latch at any point to see if a retry has occurred since the start of the sequence, block 154. In some cases it may be advantageous to test this at multiple points in the sequence, as shown, in order to minimize the action required to recover from any particular problem.

If the trap bit is set, block 156, the action response to be taken by millicode (block 158) depends on the scope of potential damage to the system state as a result of the retry operation. Minimum millicode action is re-execution of the millicode sequence. Other actions include restoration of system state and then re-execution of the sequence; presentation of a machine check to the software; CP checkstop; and system checkstop. If the trap bit is not set, the millicode sequence advances to completion.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a pipelined computer processor, which executes a relatively simple instruction set in a hardware controlled execution unit and executes a relatively complex instruction set in a milli-mode architected state with a millicode sequence of simple instructions in said hardware controlled execution unit, a method for responding to a processor hardware retry operation occurring during processor execution of a millicode instruction sequence, including the steps of:

setting, when a retry operation is performed by the processor, a retry register latch in a register that can be written to and read by millicode instructions;

resetting the retry register latch with a millicode instruction sequence at the beginning of said millicode instruction sequence if said millicode instruction sequence is sensitive to a hardware retry operation during said millicode instruction sequence;

testing the state of said retry register latch during execution of said millicode instruction sequence to determine if said retry register latch has been set during execution of said millicode instruction sequence; and initiating an action response if the testing step indicates the retry register latch has been set.

2. A method as in claim 1 wherein said testing step is repeated a plurality of times during the execution of said millicode instruction sequence.

3. A method as in claim 1 wherein said action response includes re-executing the millicode instruction sequence.

4. A method as in claim 1 wherein said action response includes restoring the system state and then re-executing the millicode instruction sequence.

5. A method as in claim 1 wherein said action response includes signalling a machine check.

6. A method as in claim 1 wherein said action response includes signalling a central processor checkstop.

7. A method as in claim 1 wherein said action response includes signalling a system checkstop.

8. A method as in claim 2 wherein said action response includes re-executing the millicode instruction sequence.

9. A method as in claim 2 wherein said action response includes restoring the system state and then re-executing the millicode instruction sequence.

10. A method as in claim 2 wherein said action response includes signalling a machine check.

11. A method as in claim 2 wherein said action response includes signalling a central processor checkstop.

12. A method as in claim 2 wherein said action response includes signalling a system checkstop.

* * * * *